(12) United States Patent  (10) Patent No.: US 8,810,553 B2
Sano et al.  (45) Date of Patent: Aug. 19, 2014

(54) LIQUID CRYSTAL DISPLAY (75) Inventors: Yutaka Sano, Azumino (JP); Takashi Kunimori, Azumino (JP); Toshihiko Tanaka, Azumino (JP); Masanori Yasumori, Azumino (JP)

(73) Assignee: Japan Display West Inc., Aichi-Ken (JP)

( * ) Notice: Subject to any disclaimer, the term of this patent is extended or adjusted under 35 U.S.C. 154(b) by 1304 days.

(21) Appl. No.: 11/730,257

(22) Filed: Mar. 30, 2007

(65) Prior Publication Data
US 2007/0229452 A1 Oct. 4, 2007

(30) Foreign Application Priority Data
Apr. 3, 2006 (JP) ................................. 2006-101622

(51) Int. Cl.
G06F 3/038 (2013.01)
G09G 5/00 (2006.01)
G09G 3/36 (2006.01)

(52) U.S. Cl.
USPC ............................................ 345/207; 345/87

(58) Field of Classification Search
USPC .................... 345/73–104, 204–215, 690–699
See application file for complete search history.

(56) References Cited

U.S. PATENT DOCUMENTS

| 6,087,703 | A * | 7/2000 | Ohta et al. ..................... 257/461 |
| 7,009,663 | B2 * | 3/2006 | Abileah et al. .................. 349/12 |
| 7,420,608 | B2 * | 9/2008 | Yamasaki ................. 348/333.01 |
| 2002/0044122 | A1 * | 4/2002 | Kuwata et al. .................. 345/88 |
| 2003/0169226 | A1 * | 9/2003 | Yamada ........................ 345/102 |
| 2003/0179323 | A1 * | 9/2003 | Abileah et al. .................. 349/24 |
| 2003/0231161 | A1 * | 12/2003 | Yamaguchi .................... 345/102 |
| 2005/0082968 | A1 * | 4/2005 | Choi et al. ..................... 313/506 |
| 2005/0116937 | A1 * | 6/2005 | Choi et al. ..................... 345/173 |
| 2005/0179625 | A1 * | 8/2005 | Choi et al. ..................... 345/76 |
| 2005/0275616 | A1 * | 12/2005 | Park et al. ..................... 345/102 |
| 2007/0046619 | A1 * | 3/2007 | Sano et al. ..................... 345/102 |
| 2007/0188441 | A1 * | 8/2007 | Tanaka et al. .................. 345/102 |
| 2008/0079860 | A1 * | 4/2008 | Kunimori et al. ............... 349/43 |
| 2008/0297466 | A1 * | 12/2008 | Kunimori et al. ............. 345/102 |

FOREIGN PATENT DOCUMENTS

JP 62-104164 A 5/1987
JP 62-189748 A 8/1987
(Continued)

*Primary Examiner* — Alexander Eisen
*Assistant Examiner* — Patrick F Marinelli
(74) *Attorney, Agent, or Firm* — K&L Gates LLP (57) ABSTRACT

A liquid crystal display (LCD) 1 according to an embodiment of the present invention includes a liquid crystal panel having a TFT substrate 2, a CF substrate 25, and a liquid crystal layer 14 interposed between the two substrates; a TFT ambient light photosensor having a semiconductor layer $19_L$ for detecting external light; a photodetector unit LS1 having a capacitor Cw in which a predetermined reference voltage is charged and a voltage charged by leakage current of the TFT ambient light photosensor is lowered; and an ambient light photosensor reader unit Re1 for reading a voltage charged in the capacitor for a predetermined read period. The photodetector unit is disposed on a first surface of the TFT substrate 2 that is in contact with the liquid crystal layer, and the surface of the photodetector unit except for the semiconductor layer $19_L$ and its periphery is covered by a light-shielding layer 21. It is therefore possible to provide an LCD in which malfunction or reduced sensitivity of its ambient light photosensor due to light from its backlights is prevented with a simple structure.

7 Claims, 12 Drawing Sheets

(56) References Cited

FOREIGN PATENT DOCUMENTS

| | | |
|---|---|---|
| JP | 06-011690 A | 1/1994 |
| JP | 09-090339 A | 4/1997 |
| JP | 2001-350158 A | 12/2001 |
| JP | 2002-131719 A | 5/2002 |
| JP | 2002-131742 A | 5/2002 |
| JP | 2003-215534 A | 7/2003 |
| JP | 2004-7237 A | 1/2004 |
| JP | 2004-140338 A | 5/2004 |
| JP | 2005-148735 A | 6/2005 |
| JP | 2005-189853 A | 7/2005 |

* cited by examiner

(prior art)

LIQUID CRYSTAL DISPLAY

BACKGROUND

1. Technical Field

The present invention relates to a liquid crystal display, particularly to a liquid crystal display that has a light source, such as a backlight and a front light, whose brightness level can be automatically changed depending on the brightness of external light.

2. Related Art

The use of liquid crystal displays (LCDs) has been widespread not only for information and communications devices but also for general electric appliances. Among them, reflective LCDs that require no back or side lights (hereinafter collectively referred to as "backlights"), unlike transmissive LCDs, have been widely used for mobile applications in order to reduce power consumption. Since the reflective LCDs use external light as their light source, they present poor display visibility in a dark room. To address this problem, there have been developed reflective LCDs employing front lights (e.g., see JP-A-2002-131742) and semi-transmissive LCDs having a combination of characteristics of transmissive and reflective LCDs (e.g., see JP-A-2001-350158). For example, reflective LCDs employing front lights display images by turning on their front lights in dark places and by using external light without using the front lights in bright places. There is no need to keep the front lights on, whereby power consumption can be significantly low. Semi-transmissive LCDs have a transmissive part with a transmissive electrode and a reflective part with a reflective electrode in each of their pixels. They display images by using the transmissive part in each pixel with their backlights turned on in dark places and by using the reflective part bringing in external light without turning on the backlights in bright places. There is again no need to keep the backlights on, whereby power consumption can be significantly cut down.

Such reflective LCDs and semi-transmissive LCDs have variable visibility depending on the intensity of external light. To ensure a highly visible display, the end user needs to take the trouble to turn on or off the backlights or lower the light level after deciding whether to turn on the backlights according to the intensity of external light. Here, the end user may unnecessarily turn on the backlights even when sufficient external light is available. When this happens, waste power consumption increases to cause quick battery drain in cellular phones and other mobile appliances.

To solve this problem, some related art examples have been developed in which an ambient light photo sensor is provided to a LCD in order to detect the intensity of external light and control on/off of the backlights according to the detection results.

For example, the LCD described in JP-A-2002-131719 includes a photodetector unit having a thin-film transistor (TFT) as an ambient light photosensor on a LCD panel substrate. The TFT ambient light photo sensor is manufactured together with another TFT serving as a switching element for the panel. By detecting photo-leakage current from the TFT ambient light photosensor, the LCD automatically turns on/off its backlight depending on the brightness of the surroundings. A LCD described in JP-A-2003-215534 includes a photodiode as an ambient light photosensor, and a light-emitting diode as a backlight provided with temperature-compensated current depending on the brightness of the surroundings. JP-A-2004-007237 describes a light-emitting diode functioning as both a backlight and a device-operation indicator and an ambient light photosensor, whereby the backlight is controlled on/off based on the electromotive force of the diode depending on the brightness of the surroundings.

Figure 12:
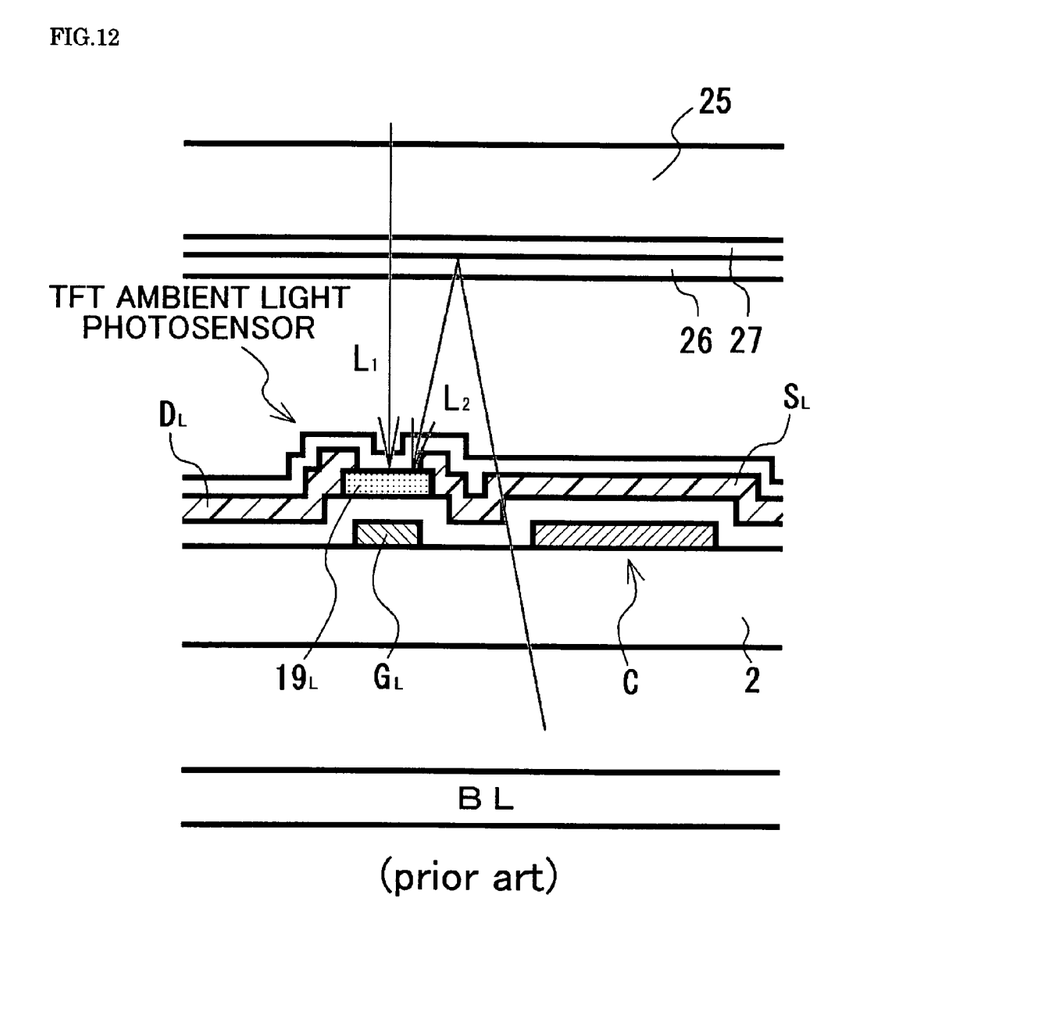
FIG. 12 is a sectional view schematically showing a TFT ambient light photosensor included in a known LCD.

However, the LCD including a TFT ambient light photosensor integrally on its substrate as described in JP-A-2002-131719 may cause malfunction or reduced sensitivity under the influence of light emitted from the backlights. FIG. 12 is a sectional view schematically showing a TFT ambient light photosensor included in a known LCD. Referring to the drawing, the TFT ambient light photosensor includes a gate electrode $G_L$, a source electrode $S_L$, a drain electrode $D_L$, and a semiconductor layer $19_L$ made of amorphous silicon, for example. Provided on an active matrix substrate 2, the TFT ambient light photosensor detects light $L_1$ incident from a display surface through a color filter substrate 25. The drawing also shows a capacitor C.

However, positioning of the TFT ambient light photosensor in this manner may generate light $L_2$ incident on the semiconductor layer $19_L$, along with the light $L_1$ incident from the display surface. This is because light emitted from a backlight BL is reflected on a layer 27, including a color filter and a black matrix, between a color filter substrate 25 and a common electrode 26. When the light $L_2$ comes in, an extra dark current flows in the TFT ambient light photosensor, thereby causing malfunction or reduced sensitivity of the TFT ambient light photosensor.

SUMMARY

An advantage of the invention is to provide an LCD having a simple structure to incorporate an ambient light photosensor detecting external light in a substrate to avoid malfunction and reduced sensitivity due to light from its backlights.

Another advantage of the invention is to provide an LCD that automatically controls on/off of its backlights not only at a predetermined level of brightness but also at brightness levels desired by end users.

A liquid crystal display (LCD) according to a first aspect of the present invention includes a liquid crystal panel having an active matrix substrate, a opposed substrate, and a liquid crystal layer interposed between the two substrates; an ambient light photosensor having a semiconductor layer for detecting external light; a photodetector unit having a first capacitor in which a predetermined reference voltage is charged and a voltage charged by leakage current of the ambient light photosensor is lowered; and an ambient light photosensor reader unit for reading a voltage charged in the first capacitor for a predetermined read period. The photodetector unit is disposed on a surface of the active matrix substrate that is in contact with the liquid crystal layer, and the surface of the photodetector unit except for the semiconductor layer and its periphery is covered by a light-shielding layer.

Since the surface of the photodetector unit provided to the active matrix substrate except for the semiconductor layer that detects external light and its periphery included in the ambient light photosensor is covered by a light-shielding layer, light from the backlight that has passed through the active matrix substrate and been reflected on a opposed substrate or the like can be prevented from entering the ambient light photosensor. It is therefore possible to prevent malfunction or reduced sensitivity of the ambient light photosensor. This feature is achieved with a simple structure in which the photodetector is simply covered.

In the above-described LCD, preferably, the photodetector unit and the ambient light photosensor reader unit are provided to the surface of the active matrix substrate that is in contact with the liquid crystal layer. In the photodetector unit and the ambient light photosensor reader unit, the surface of the photodetector unit except for the semiconductor layer that detects external light and its periphery is covered by a light-shielding layer.

Since the ambient light photosensor reader unit as well as the photodetector unit is provided to the active matrix substrate, the ambient light photosensor reader unit is also provided with the light-shielding layer in addition to the above-mentioned advantage. It is therefore possible to easily shield the ambient light photosensor reader unit from light.

In the above-described LCD, preferably, the light-shielding layer is made of a resin material containing a light-shielding material.

Since the light-shielding layer is made of a light-shielding material that shields light, such as a resin material in which carbon or titanium is dispersed in a photoresist, the light from the backlight is prevented from being reflected on a lower portion of the light-shielding layer, and then passing through an insulating layer or the like of the active matrix substrate to enter the ambient light photosensor. It is therefore possible to further prevent malfunction or reduced sensitivity of the ambient light photosensor.

In the above-described LCD, preferably, the ambient light photosensor of the photodetector unit is a thin-film transistor (TFT) that is manufactured together with another TFT serving as a switching element for the liquid crystal panel in a process for manufacturing the active matrix substrate.

Since the TFT as the ambient light photosensor is manufactured together with another TFT serving as a switching element for the active matrix substrate, there is no need to increase a manufacturing process for providing the ambient light photosensor.

The above-described LCD, preferably, also includes an illuminating unit for illuminating the liquid crystal panel, and a controller unit for controlling the illuminating unit in accordance with an output from the ambient light photosensor reader unit. The controller unit includes a threshold memory and a comparator. In normal operation mode, the comparator compares an output from the photodetector unit and a threshold stored in the threshold memory, and a comparison result is used for controlling on/off of the illuminating unit. In default mode, the ambient light photosensor is irradiated with reference light, and an output from the photodetector unit is stored in the threshold memory.

Since the LCD also includes an illuminating unit, such as the backlight, and a controller, a reference threshold for on/off control of the illuminating unit can be modified by irradiating the ambient light photosensor with reference light in default mode even when there are variations in the ambient light photosensor's characteristics. It is therefore possible to automatically control on/off of the illuminating unit at a precisely predetermined level of brightness. Moreover, since this structure allows end users to select desired levels of brightness for the reference light, it is possible to automatically turn on/off the backlight etc. in accordance with brightness levels desired by end users.

In the above-described LCD, preferably, the liquid crystal panel is a transmissive LCD panel or a semi-transmissive LCD panel.

Accordingly, the above-described advantages are applicable to a transmissive or semi-transmissive LCD.

BRIEF DESCRIPTION OF THE DRAWINGS

The invention will be described with reference to the accompanying drawings, wherein like numbers reference like elements.

DESCRIPTION OF EXEMPLARY EMBODIMENTS

Preferred embodiments of the invention will be now described with reference to the accompanying drawings. It should be noted that the description below is given to illustrate a semi-transmissive LCD as an example of an LCD to embody the technical concept of the invention, and is not intended to limit the invention. Various changes and modifications can be made without departing from the spirit and scope of the claims appended hereto.

First Embodiment

Figure 1:
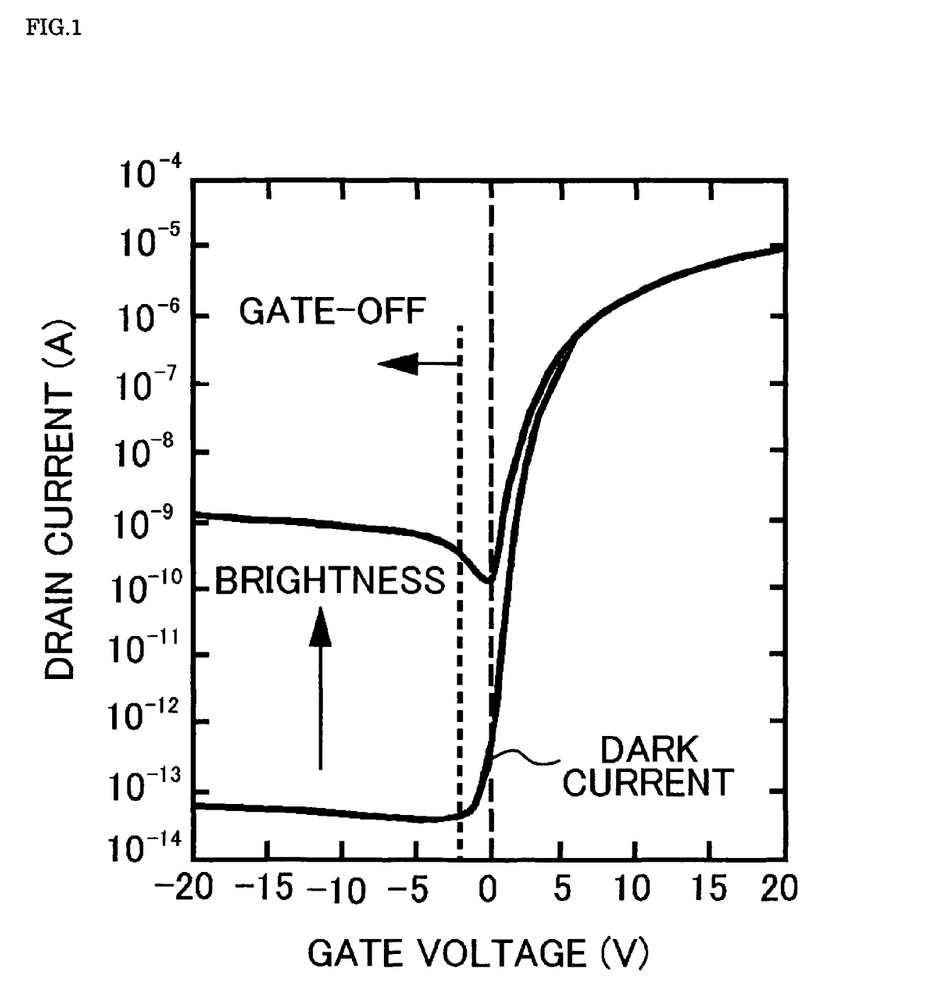
FIG. 1 shows an example of the voltage-current curve of a TFT ambient light photosensor.
Figure 2:
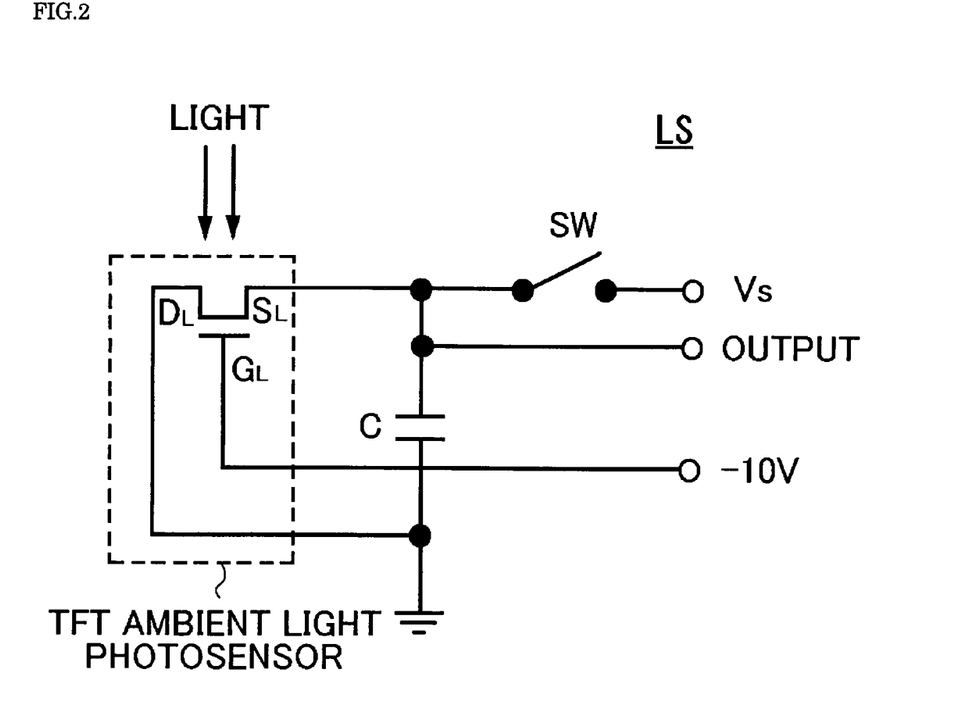
FIG. 2 is a circuit diagram of a photodetector unit using the TFT ambient light photosensor.
Figure 3:
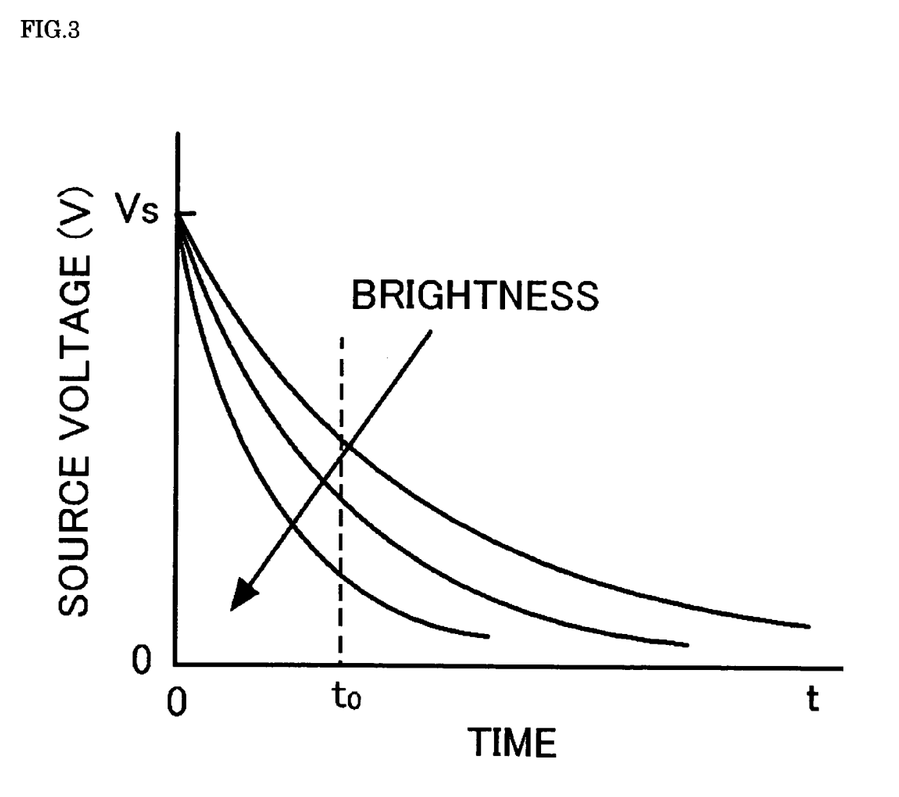
FIG. 3 shows the voltage-time curve at both ends of a capacitor included in the circuit diagram of FIG. 2 with different brightness levels.

Referring to FIGS. 1 through 3, the known operation principle of a TFT as an ambient light photosensor (hereinafter referred to as the "TFT ambient light photosensor") and a driving circuit therefor will be described. FIG. 1 shows an example of the voltage-current curve of the TFT ambient light photosensor. FIG. 2 is a circuit diagram of a photodetector unit using the TFT ambient light photosensor. FIG. 3 shows the voltage-time curve at both ends of a capacitor C included in the circuit diagram of FIG. 2 with different brightness levels. Like reference numerals in FIG. 2 designate like structural elements.

The TFT ambient light photosensor has practically the same structure as another TFT serving as a switching element for an active-matrix LCD panel. Referring to FIG. 1, an ultra-low dark current flows in the TFT ambient light photosensor in the gate-off state when it is light-shielded, and a leakage current increases depending on the intensity (brightness) of light shed on the channel region. Referring to the circuit diagram of a photodetector unit LS in FIG. 2, a constant reverse bias voltage (e.g. −10 V) is applied to the gate electrode $G_L$ of the TFT ambient light photosensor to turn it into the gate-off state, a capacitor C is coupled in parallel between the drain electrode $D_L$ and the source electrode $S_L$, and a constant reference voltage Vs (e.g. +2 V) is applied to both ends of the capacitor C with a switching element SW turned on. Subsequently, when the switching element SW is turned off, the voltage on both ends of the capacitor C decreases as time passes depending on the brightness of the surroundings of the TFT ambient light photosensor as shown in FIG. 3. Accordingly, since the voltage on both ends of the capacitor C is inversely proportional to the surrounding brightness of the TFT ambient light photosensor, the surrounding. brightness is calculated by measuring the voltage after a predetermined time period to after the switching element SW is turned off.

Figure 4:
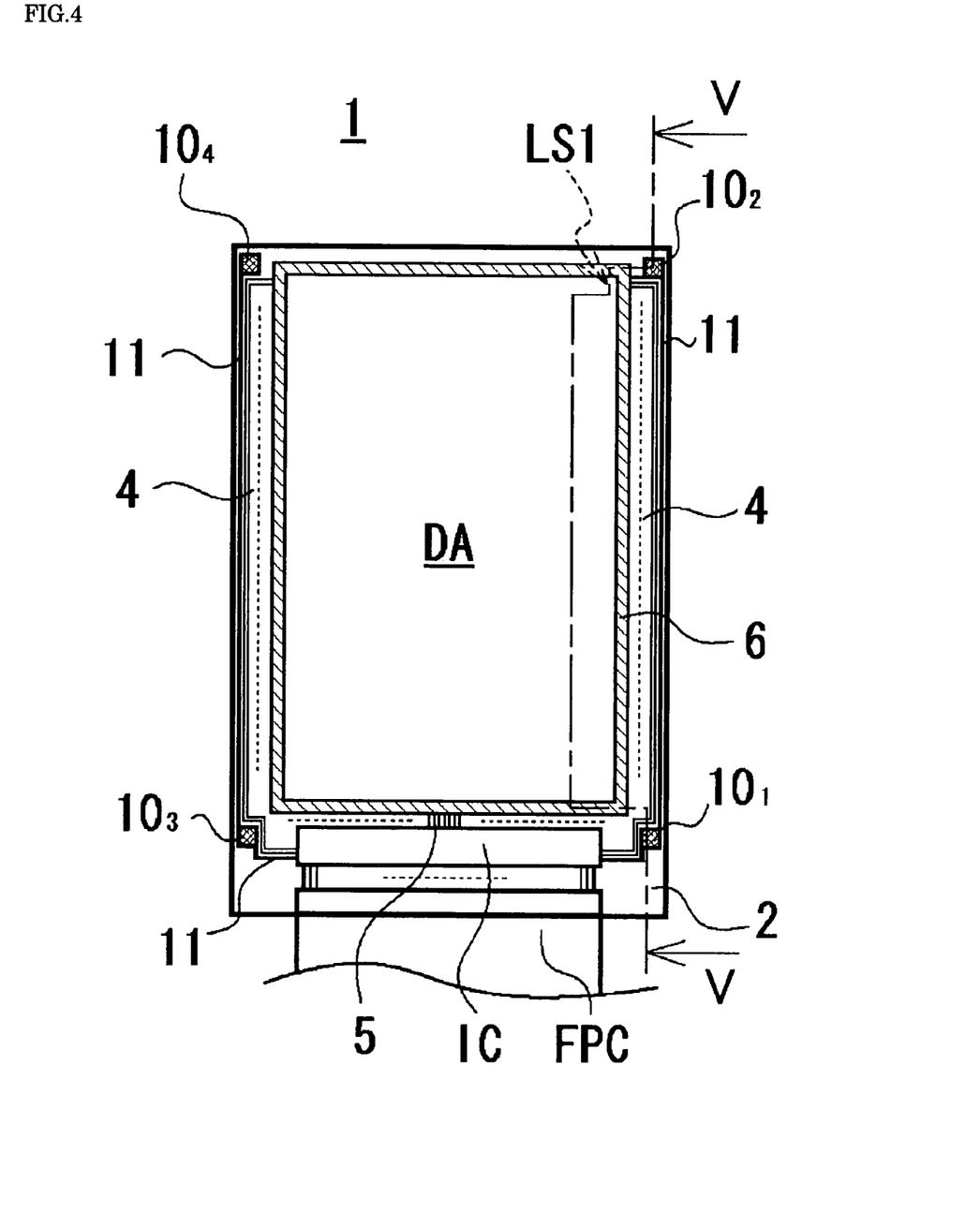
FIG. 4 is a plan view schematically showing an active matrix substrate seen through a color filter substrate included in a liquid crystal display (LCD) according to an embodiment of the invention.
Figure 5:
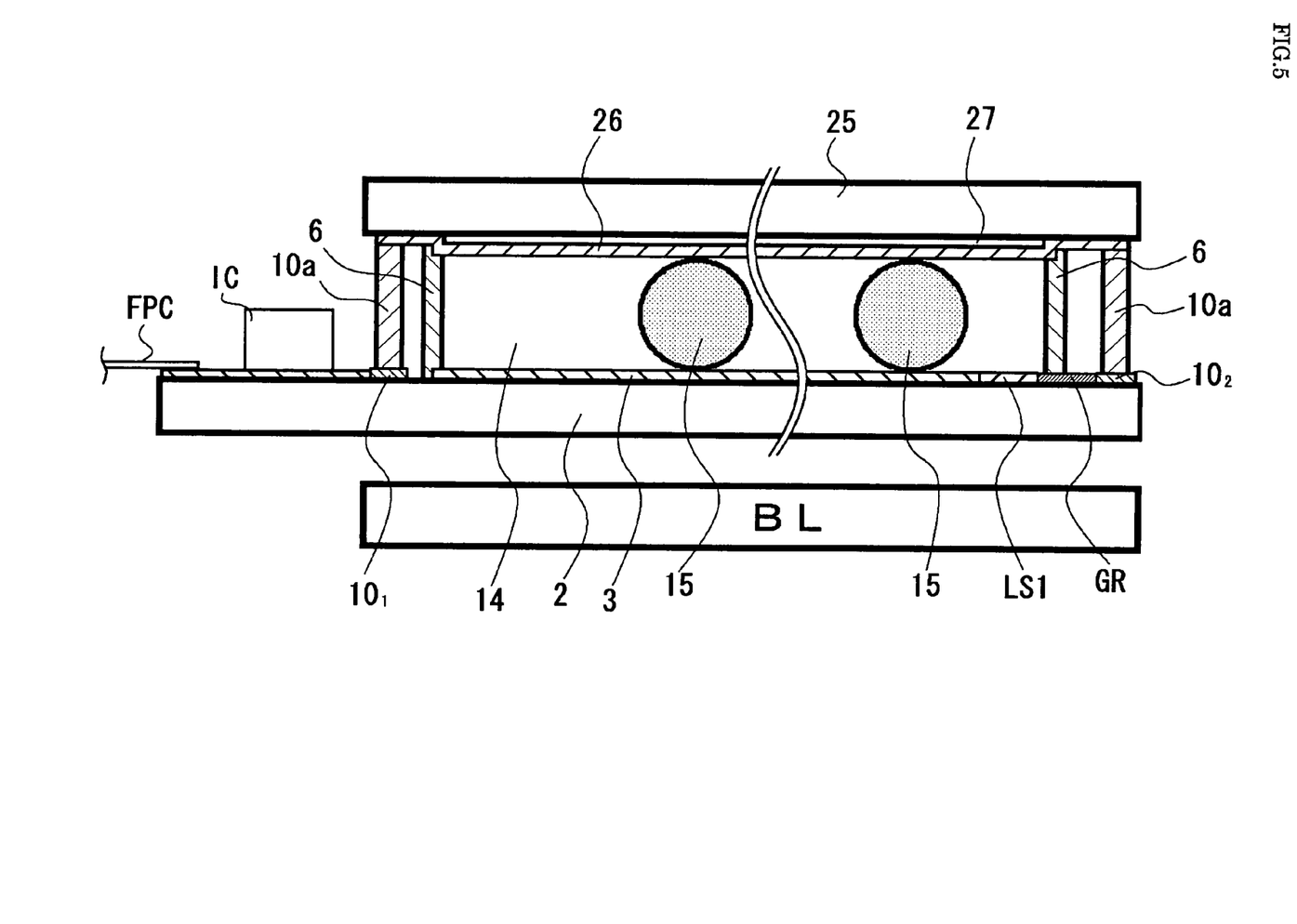
FIG. 5 is a sectional view along line X-X of FIG. 4.

Referring next to FIGS. 4 and 5, a semi-transmissive LCD in which the ambient light photosensor according to the present embodiment is incorporated will be described. FIG. 4 is a plan view schematically showing an active matrix substrate seen through a color filter substrate included in the LCD. FIG. 5 is a sectional view along line V-V of FIG. 4.

Referring to FIG. 5, the LCD 1 includes an active matrix substrate (referred to as the "TFT substrate") 2, a color filter substrate (referred to as the "CF substrate") 25, and a liquid crystal layer 14 interposed between the two substrates. The TFT substrate 2 is made of a transparent insulating material, such as a glass substrate, and provided with a TFT, for example, on its surface. The CF substrate 25 is provided with a color filter, for example, on its surface.

The TFT substrate 2 is provided in its display area DA with gate lines 4 and source lines 5 forming a matrix. As shown in FIG. 7, a pixel electrode 12 is provided in an area between one gate line 4 and one source line 5, and a TFT serving as a switching element is provided and coupled to an intersection of the gate line 4 and source line 5. Provided on an outer rim within the display area DA is a photodetector unit LS1. The TFT, pixel electrode, and wiring therefor are schematically shown as a first structure 3 in FIG. 5, and their detailed structure will be later described with reference to FIGS. 6 to 8.

Referring to FIG. 4, the TFT substrate 2 on its shorter side has a flexible wiring substrate FPC to be coupled to an image supply device (not shown) to drive the LCD 1. The flexible wiring substrate FPC couples data lines and control lines from the image supply device to a driver IC. The driver IC generates VCOM signals, source signals, and gate signals, for example, for driving liquid crystal to be supplied to a common line 11, the source line 5, and the gate line 4, respectively, on the TFT substrate 2.

Provided on the four corners of the TFT substrate 2 are a plurality of transfer electrodes $10_1$ to $10_4$. These electrodes $10_1$ to $10_4$ are coupled to each other directly through the common line 11 or within the driver IC to have an equal potential. Each of the electrodes $10_1$ to $10_4$ is electrically coupled to a common electrode 26, which will be described later. The common electrode 26 is applied with a common electrode voltage output from the driver IC.

The CF substrate 25 is provided with a plurality of color filters, for example, red (R), green (G), and blue (B) filters, and a black matrix on a glass plate. The CF substrate 25 is positioned face to face with the TFT substrate 2. The black matrix is positioned at least corresponding to the gate and source lines of the TFT substrate 2. The black matrix defines the areas in which the color filters are provided. The color filters and the like are not shown in detail and are schematically shown as a second structure 27 in FIG. 5. The CF substrate 25 is also provided with a common electrode 26 that is a transparent electrode made of indium oxide or tin oxide, for example. This common electrode 26 is extended to a position facing the photodetector unit LS1 provided to the TFT substrate 2 as shown in FIG. 5.

The TFT substrate 2 and CF substrate 25 are positioned face to face and coupled to each other with a gap for having the liquid crystal layer 14 therebetween. A sealing agent 6 is used to prevent the liquid crystal from falling from the gap between the two substrates.

The sealing agent 6 is applied to the periphery of the display area DA of the TFT substrate 2 except for an inlet (not shown). The sealing agent 6 is made by, for example, mixing thermosetting resin, such as epoxy resin, and an insulating particulate filler. A contact material 10a for coupling the two substrates is made of, for example, metal-plated conductive particles and thermosetting resin.

The two substrates 2 and 25 are stuck together in the following manner. The TFT substrate 2 is first mounted on a first dispenser to apply the sealing agent 6 thereto in a predetermined pattern, and is then mounted on a second dispenser to apply the contact material 10a on the transfer electrodes $10_1$ to $10_4$. Then, a spacer 15 is evenly applied to the display area DA of the TFT substrate 2, and an adhesive for temporary bonding is applied to an area of the CF substrate 25 that is in contact with the sealing agent 6 and the contact material 10a. Subsequently, the TFT substrate 2 and CF substrate 25 are stuck together and the adhesive is hardened, which completes temporary bonding. The temporarily bonded substrates 2 and 25 are thermally treated with pressure to harden the thermosetting resin of the sealing agent 6 and of the contact material 10a, thereby completing a hollow LCD panel. Next, liquid crystal 14 is injected into this hollow panel through an inlet (not shown) and thereafter the inlet is sealed with a sealant, which completes a semi-transmissive LCD panel. To assemble this LCD panel, a backlight BL is also provided below (back of) the panel, namely, the TFT substrate 2.

Figure 6:
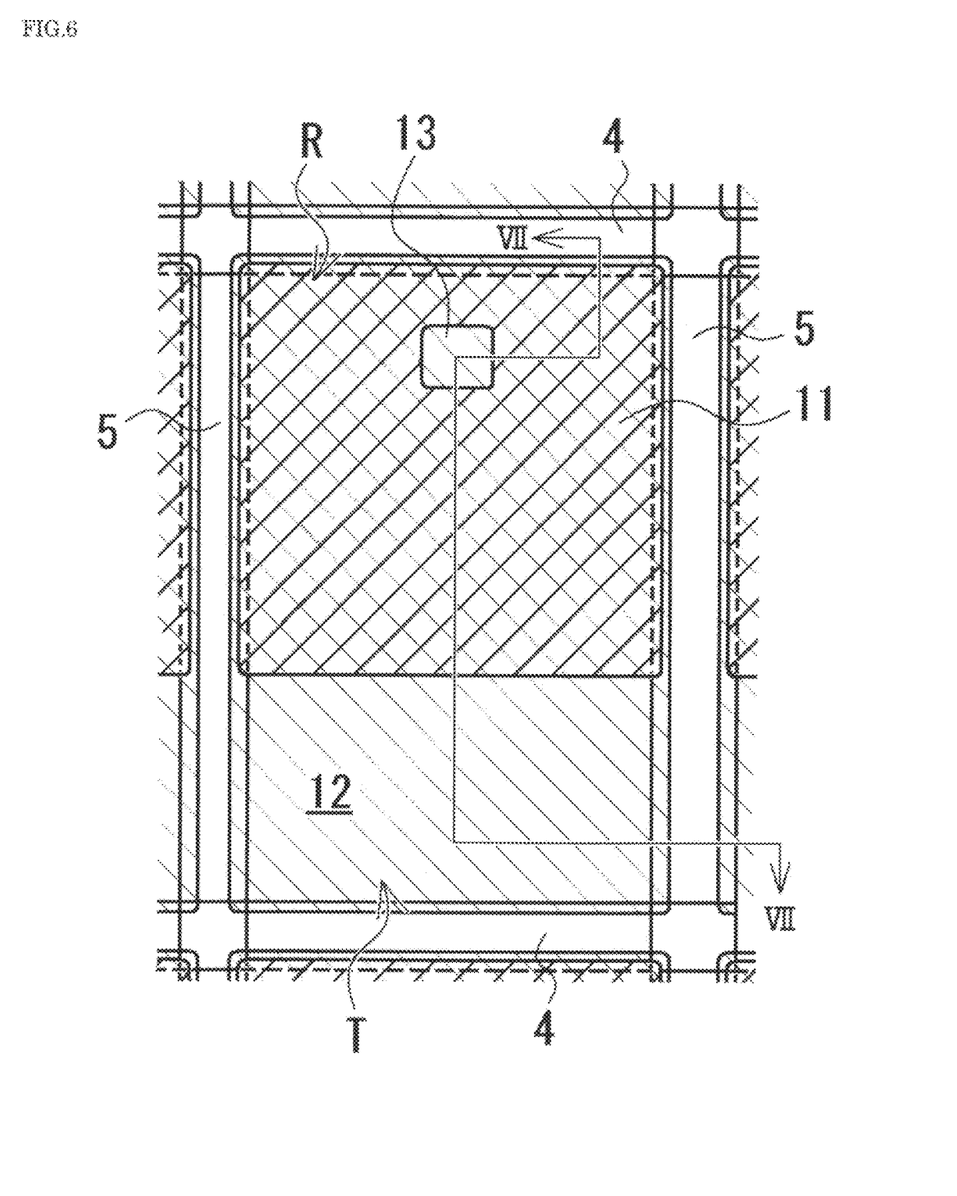
FIG. 6 is a plan view showing a single pixel seen through a color filter substrate included in a semi-transmissive LCD.
Figure 7:
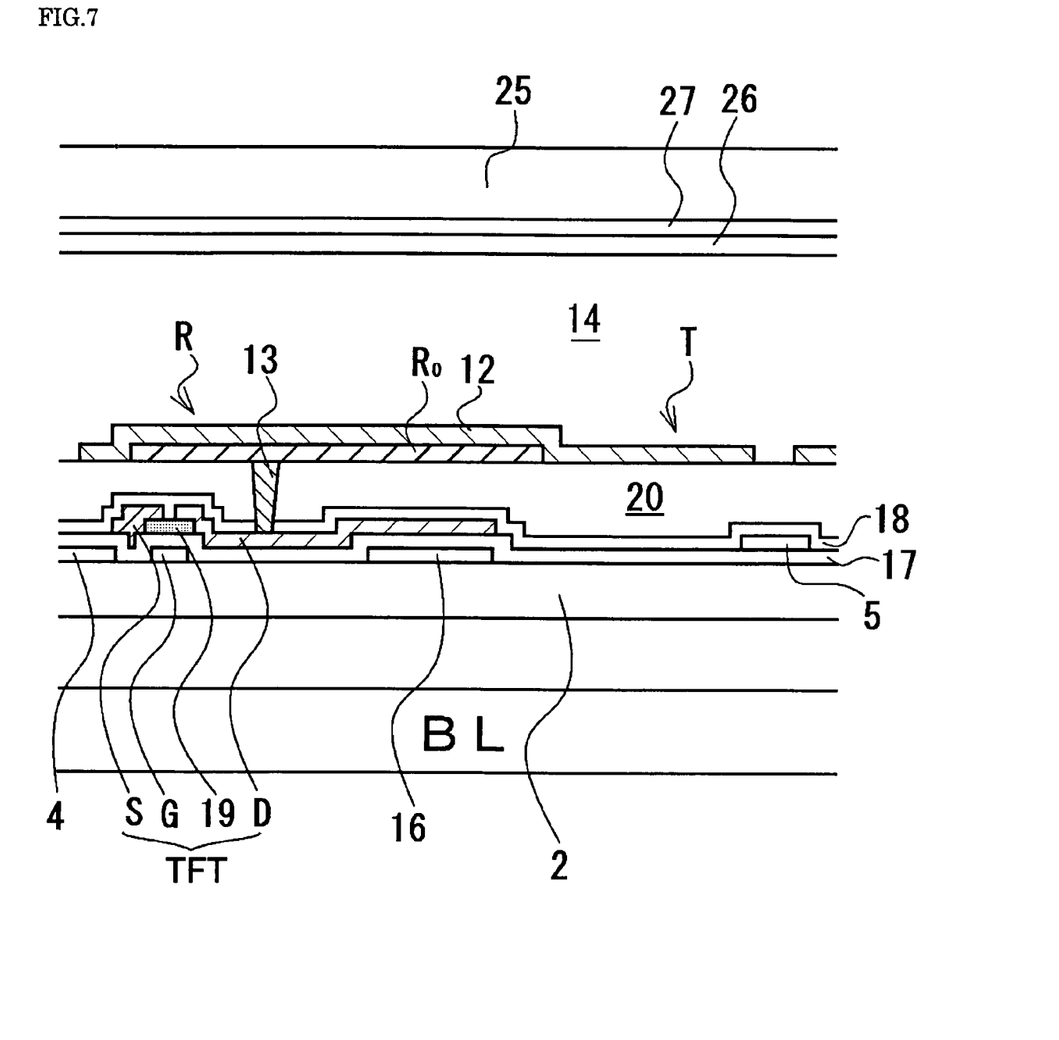
FIG. 7 is a sectional view along line A-A of FIG. 6, with the color filter substrate included.
Figure 8:
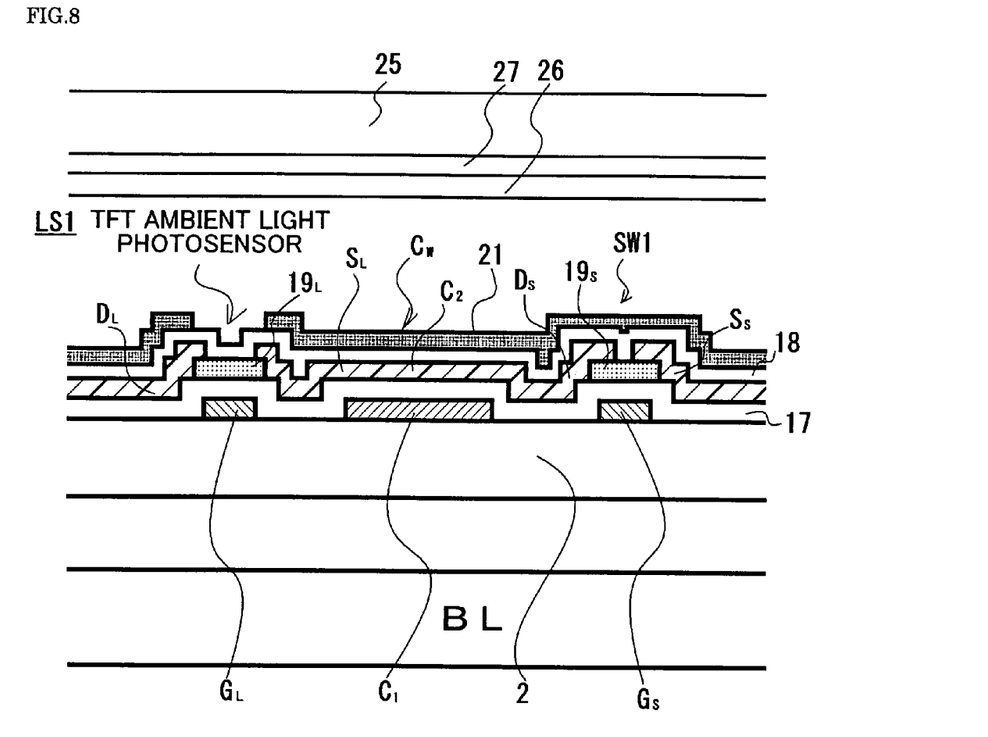
FIG. 8 is a sectional view showing an ambient light photosensor and a switching element on a thin-film transistor (TFT) substrate.

Referring now to FIGS. 6 to 8, the pixel structure of this LCD will be described. FIG. 6 is a plan view showing a single pixel seen through the CF substrate included in the LCD. FIG. 7 is a sectional view along line A-A of FIG. 6, with the CF substrate included. FIG. 8 is a sectional view showing an ambient light photosensor and a switching element on the TFT substrate.

On the display area DA of the TFT substrate 2, a plurality of gate lines 4 made of metal, such as aluminum or molybdenum, are aligned in parallel at regular intervals. Provided to the center or nearly the center between two adjacent gate lines 4 in parallel with them is an auxiliary capacitance line 16. From each gate line 4, the gate electrode G of the TFT is extended. Also on the TFT substrate 2, a gate insulator 17, for example, made of silicon nitride or silicon oxide, is deposited to cover the gate line 4, auxiliary capacitance line 16, and gate electrode G. Provided on the gate electrode G is a semiconductor layer 19, for example, made of amorphous silicon or polysilicon, with the gate insulator 17 therebetween. On top of the gate insulator 17, a plurality of source lines 5 made of metal, such as aluminum or molybdenum, are provided in a direction perpendicular to the gate lines 4. From each source line 5, the source electrode S of the TFT is extended so as to be in contact with the semiconductor layer 19. Furthermore, the drain electrode D of the TFT made together with and of the same material as the source lines 5 and source electrode S is provided on the gate insulator 17. The drain electrode D is also made in contact with the semiconductor layer 19.

Two adjacent gate lines 4 and two adjacent source lines 5 define pixel areas. Each pixel has a TFT serving as a switching element having the gate electrode G, gate insulator 17, semiconductor layer 19, source electrode S, and drain electrode D. Here, the drain electrode D and auxiliary capacitance line 16 constitute an auxiliary capacitance for the pixel.

A protective insulator 18, for example, made of an inorganic insulating material, is further deposited to cover the source line 5, TFT, and gate insulator 17. On top of the protective insulator 18, an interlayer 20 made of an organic insulator is deposited. The surface of this interlayer 20 has a reflective part R having a finely protruded and recessed surface and a flat transmissive part T. Therefore, external light incident through the CF substrate 25 is reflected on the reflective part R, while light from the backlight BL is transmitted through the transmissive part T. The protruded and recessed surface in the reflective part R of the interlayer 20 is not shown in FIG. 7. At a position corresponding to the TFT drain electrode D, a contact hole 13 is formed through the protective insulator 18 and interlayer 20. Provided above the contact hole 13 and a part of the surface of the interlayer 20 in the reflective part R of each pixel is a reflective electrode $R_O$, for example, made of aluminum metal. Provided on the surface of the reflective electrode $R_O$ and of the interlayer 20 in the transmissive part T is a pixel electrode 12, for example, made of indium tin oxide (ITO).

Provided on the TFT substrate 2 are a TFT ambient light photosensor and a switching element SW1 both of which include TFT. Specifically, as shown in FIG. 8, the gate electrode $G_L$ of the TFT ambient light photosensor, a first terminal $C_1$ of a capacitor Cw, and the gate electrode $G_S$ of the TFT serving as the switching element SW1 (also referred to as the "TFT switching element") are provided on the TFT substrate 2. The gate insulator 17, made of silicon nitride, silicon oxide, or the like, is deposited to cover the surface of these elements. Provided on the gate electrode $G_L$ of the TFT ambient light photosensor and the gate electrode $G_S$ of the TFT switching element SW1 are semiconductor layers $19_L$ and $19_S$, respectively, made of amorphous silicon or polysilicon, for example, with the gate insulator 17 therebetween. On top of the gate insulator 17, the source electrode $S_L$ and drain electrode $D_L$, made of metal, such as aluminum or molybdenum, of the TFT ambient light photosensor and the source electrode $S_S$ and drain electrode $D_S$ of the TFT switching element SW1 are provided so as to be in contact with the semiconductor layers $19_L$ and $19_S$, respectively. The source electrode $S_L$ of the TFT ambient light photosensor and the drain electrode $D_S$ of the TFT switching element SW1 are extended and coupled to each other at an area serving as a second terminal $C_2$ of the capacitor Cw. Furthermore, the protective insulator 18, for example, made of an inorganic insulating material, is deposited to cover the surface of the TFT ambient light photosensor, capacitor Cw, and TFT switching element SW1.

The surface of the protective insulator 18 is covered with a light-shielding thin film 21 except for the light-sensitive part, namely the semiconductor layer $19_L$, of the TFT ambient light photosensor and its periphery. The light-shielding thin film (layer) 21 is made of metal chromium used for the black matrix, resin black in which carbon or titanium is dispersed in a photoresist, or a metal material, such as nickel. The film can instead have a low reflecting, two-layered structure of metal chromium and chromium oxide.

Since the surface in the photodetector unit LS1 is covered with the light-shielding film (layer) except for the semiconductor layer $19_L$ of the TFT ambient light photosensor and its periphery, no external light enters the switching element SW1, and no light from the backlight BL reflected on the black matrix in the CF substrate, for example, enters the TFT ambient light photosensor. This structure therefore prevents malfunction or reduced sensitivity of the ambient light photosensor. Also, light shielding can be implemented simply by covering the photodetector unit.

If the light-shielding layer 21 is made of a resin material in which carbon or titanium is dispersed in a photoresist, for example, the light from the backlight is prevented from being reflected on a lower portion of the light-shielding layer, and then passing through an insulating layer or the like provided to the active matrix substrate to enter the ambient light photosensor. It is therefore possible to further prevent malfunction or reduced sensitivity of the ambient light photosensor. On the side of the CF substrate 25 provided face to face with the surface provided with the photodetector unit LS1, the common electrode 26 is extended to the position facing the photodetector unit LS1. The drain electrode $D_L$ of the TFT ambient light photosensor included in the photodetector unit LS1 and the second terminal $C_2$ of the capacitor Cw on a ground terminal GR side are coupled to the common electrode 26 with a transfer electrode $10_2$ therebetween (see FIG. 5).

Figure 9:
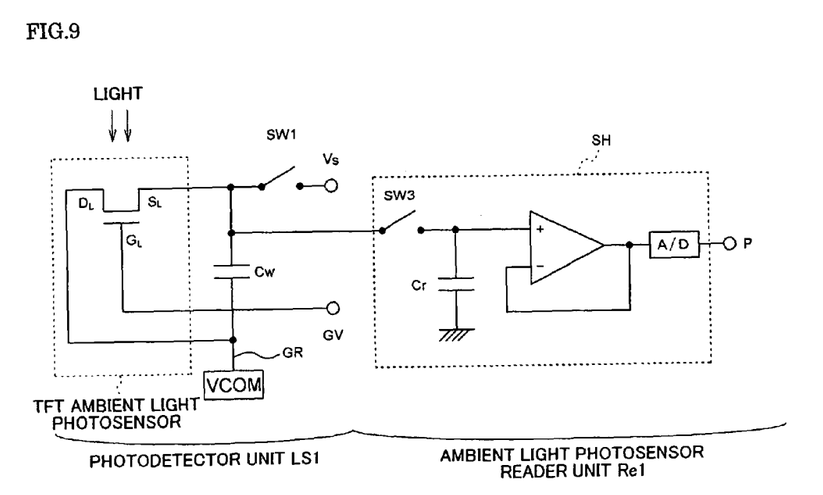
FIG. 9 is a circuit diagram showing a photodetector unit and an ambient light photosensor reader unit.
Figure 10:
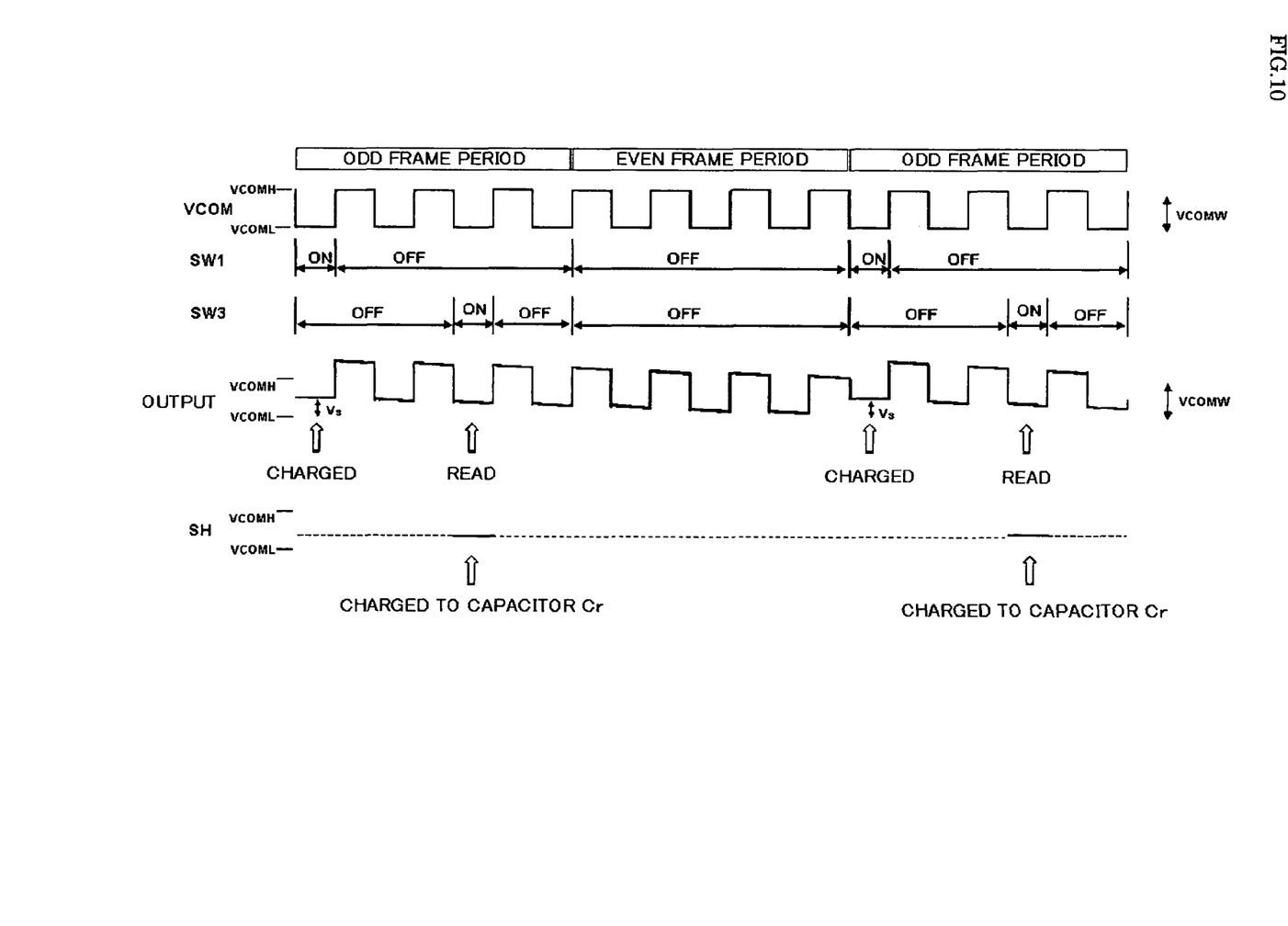
FIG. 10 is a timing chart showing output waveforms of the components shown in FIG. 9.

Referring next to FIGS. 9 and 10, the structures and operations of the photodetector unit LS1 and an ambient light photosensor reader unit Re1 will be described. FIG. 9 is a circuit diagram showing the photodetector unit and ambient light photosensor reader unit. FIG. 10 is a timing chart showing output waveforms of the components shown in FIG. 9.

Referring to FIG. 9, the photodetector unit LS1 includes the drain electrode $D_L$ and source electrode $S_L$ of the TFT ambient light photosensor and the capacitor Cw provided in parallel between the two electrodes. The source electrode $S_L$ and a first terminal of the capacitor Cw are coupled to a reference voltage source via the switching element SW1. The drain electrode $D_L$ of the TFT ambient light photosensor and a second terminal of the capacitor Cw are coupled to a common electrode (VCOM). The ambient light photosensor reader unit Re1 is a publicly known sampling hold circuit SH including a holding capacitor Cr that stores the charge of the capacitor Cw included in the photodetector unit LS1, an OP amplifier that amplifies the output voltage from the holding capacitor Cr, and an A/D converter that converts analog output from the OP amplifier into digital data. The photodetector unit LS1 and ambient light photosensor reader unit Re1 are coupled via a switching element SW3. The holding capacitor Cr has a larger capacity than that of the capacitor Cw. While the photodetector unit LS1 and ambient light photosensor reader unit Re1 are provided to the outer peripheral rim of the display area DA of the TFT substrate 2 in the present embodiment, the photodetector unit LS1 particularly may be provided to the inner peripheral rim of the display area DA.

The operations of the photodetector unit LS1 and ambient light photosensor reader unit Re1 will now be described.

The common electrode 26 of the LCD panel is applied with a common electrode voltage VCOM having a predetermined amplitude. In FIG. 10, VCOMH indicates a high-level voltage and VCOML indicates a low-level voltage. The TFT ambient light photosensor and capacitor Cw are also applied with the voltage VCOM. In addition, the gate electrode $G_L$ of the TFT ambient light photosensor is applied with a predetermined negative voltage GV in sync with the voltage VCOM. The voltage GV has the same amplitude as the voltage VCOM, and is consistently lower than the voltage VCOM by a predetermined reverse bias voltage, e.g., 10 V. In other words, the high-level voltage GVH of the voltage GV is calculated by subtracting 10 V from the voltage VCOMH, and the low-level voltage GVL by subtracting 10 V from the voltage VCOML.

By controlling the switching element SW1 for predetermined frame periods, for example, for ODD and EVEN frame periods under this state, the photodetector unit LS1 is applied with a predetermined reference voltage Vs from the reference voltage source. For example, the switching element SW1 is turned on in the VCOML period in an ODD frame period, whereby the capacitor Cw is applied with the reference voltage Vs and charged. Through this charging, a potential difference Va between the reference voltage Vs and voltage VCOML is applied to both ends of the capacitor Cw for charging. However, the voltage difference decreases due to a leak current caused by light incident to the TFT ambient light photosensor if the switching element SW1 is turned off, since the gate electrode $G_L$ is gated off with the voltage GVL applied. In the VCOML period in the same ODD frame period, the switching element SW3 is turned on, whereby the charge of the capacitor Cw is shifted to the holding capacitor Cr for charging. In a similar manner, the switching element SW1 is turned on again in the VCOML period in the next ODD frame period, thereby charging the capacitor Cw with the reference voltage Vs, turning off the switching element SW1 and instead turning on the switching element SW3, and shifting the charge of the capacitor Cw to the holding capacitor Cr for charging. Subsequently, on/off switching of the switching elements SW1 and SW3 is repeated in a similar manner, whereby the holding capacitor Cr is charged with the voltage accumulated in the capacitor Cw. By repeating on/off switching of the switching elements SW1 and SW3, the voltage of the holding capacitor Cr accumulated for a plurality of frame periods is detected for photodetection. Thus, even if the voltage accumulated in the capacitor Cw during one frame period varies depending on instantaneous changes in the amount of light, noise, or other factors, there are no large effects on the voltage accumulated in the holding capacitor Cr. It is therefore possible to provide stable photodetection results. While the switching element SW1 in the photodetector unit LS1 is turned on in the VCOML period for photodetection, it may be turned on in the VCOMH period to achieve the same detection results. In addition, while no on/off switching of the switching elements SW1 and SW3 is performed in EVEN frames in this example, it may be in EVEN frames.

Thus, the voltage accumulated in the holding capacitor Cr in a predetermined frame period is input and amplified in the OP amplifier and is analog/digital converted to produce a read output P.

Figure 11:
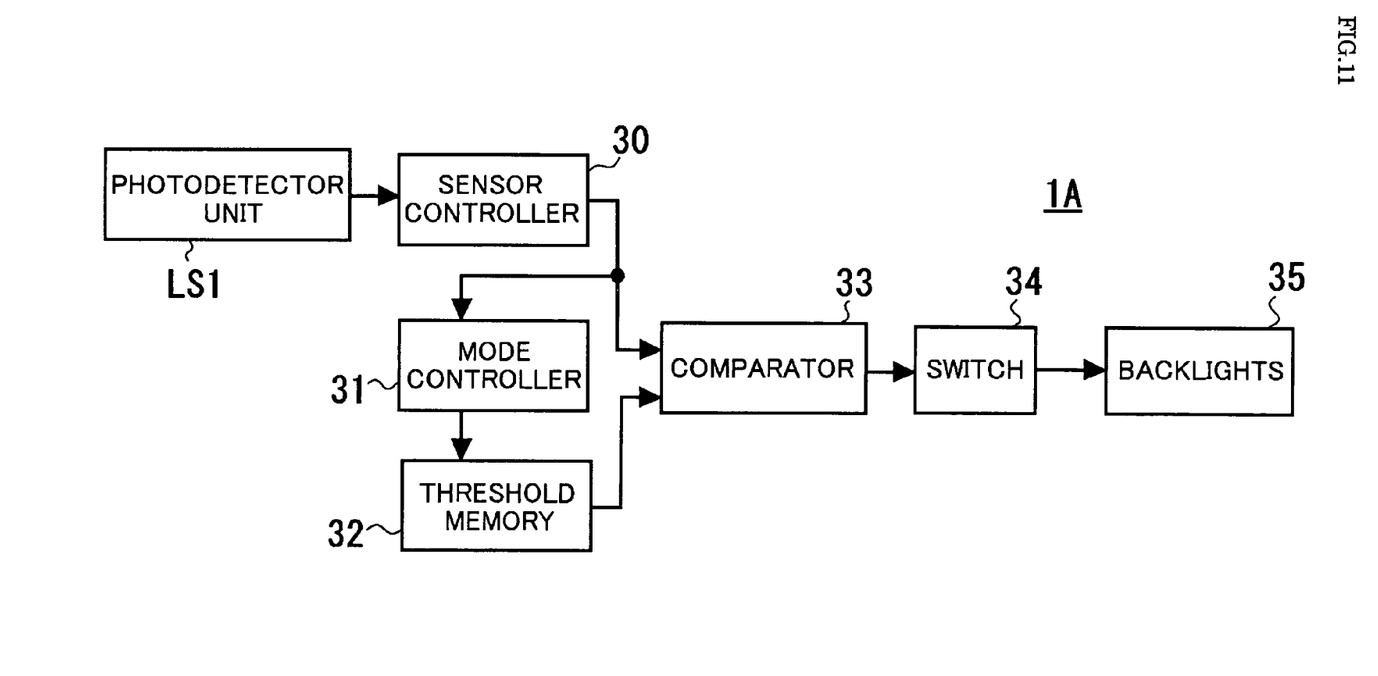
FIG. 11 is a block diagram of a controller.

The output P from the ambient light photosensor reader unit Re1 is input to a controller unit 1A so as to control on/off of an illuminating unit. FIG. 11 is a block diagram of the controller.

The output from the ambient light photosensor reader unit Re1 is processed by a sensor controller 30 and input to one terminal of a comparator 33, and is also input to a mode controller 31. The mode controller 31 switches normal and default operation modes in response to signals input from outside. In default mode, outputs from the sensor controller 30 are input and stored in a threshold memory 32. In normal operation mode, outputs from the sensor controller 30 are blocked so as not to be input in the threshold memory 32, while the threshold stored in the threshold memory 32 is output to the other terminal of the comparator 33.

In normal operation mode, the comparator 33 compares input signals from the sensor controller 30 and from the threshold memory 32. When a signal, input from the controller 30 is larger (brighter) than the threshold stored in the memory 32, backlights 35 (illuminating unit) are turned off via a switch 34. On the contrary, when a signal input from the controller 30 is smaller (darker) than the threshold stored in the memory 32, the backlights 35 are turned on via the switch 34.

When the default mode is selected in the mode controller 31, outputs from the sensor controller 30 are stored in the threshold memory 32. Accordingly, by exposing the TFT ambient light photosensor to light of predetermined brightness, the threshold for this brightness level is stored. Therefore, even if the TFT ambient light photosensor has variations in photoelectric characteristics, it is possible to control on/off of the backlights accurately with a predetermined brightness threshold.

In this case, the predetermined brightness of light may be fixed in a manufacturing process, or may be set by the end user so that on/off of the backlights can be automatically controlled at a desirable level. The comparator 33 may have hysteresis characteristics for setting different brightness levels for turning on and off the backlights so as not to frequently control on/off of the backlights. The hysteresis characteristics are easily available by using a hysteresis comparator as the comparator 33.

The number of the TFT ambient light photosensor used in the present embodiment is not limited to one, and a plurality of ambient light photosensors may be used. For example, an average of outputs from a plurality of ambient light photosensors or a difference between outputs from a light-shielded TFT ambient light photosensor (dark-field reference) and from an unshielded TFT ambient light photosensor may be used, thereby improving brightness measurement accuracy.

The sensor controller 30, mode controller 31, threshold memory 32, comparator 33, and switch 34 according to the present embodiment may be incorporated into the driver IC in the LCD. The threshold memory 32 may not be provided inside the LCD 1 as long as an external host computer having the threshold memory 32 is configured to initialize the LCD 1 when starting up the LCD 1.

What is claimed is:

1. A liquid crystal display comprising:
   a liquid crystal panel including an active matrix substrate, an opposed substrate, and a liquid crystal layer interposed between the two substrates;
   a photodetector unit including:
      an ambient light photosensor having a semiconductor layer for detecting external light, a gate insulating layer, a source electrode, a gate electrode, and a drain electrode,
      a first capacitor that is charged to a predetermined reference voltage, and is subsequently lowered by a leakage current of the ambient light photosensor caused by an ambient light, and
      a first switching element comprising a first electrode directly coupled to a voltage source of the predetermined reference voltage, and a second electrode of the first switching element directly coupled to the source electrode and the first capacitor, wherein the first capacitor comprises a first electrode that is directly coupled to a common electrode, the drain electrode is directly coupled to the common electrode, and the gate electrode is directly coupled to a gate voltage;
   an insulating layer being disposed on the ambient light photosensor; an ambient light photosensor reader unit for reading a voltage charged in the first capacitor for a predetermined read period, wherein the photodetector unit is disposed on a first surface of the active matrix substrate that is in contact with the liquid crystal layer, and the surface of the photodetector unit except for the semiconductor layer and a periphery thereof is covered by a light-shielding layer formed on the active matrix substrate; and
   a second switching element comprising a first electrode that is directly coupled to the first capacitor and the source electrode,
   wherein the second switching element is provided for the liquid crystal panel in a region other than the ambient light photosensor and the ambient light photosensor reader unit, wherein the second switching element and the first capacitor in the photodetector unit are entirely covered by the light-shielding layer, and wherein the second switching element further comprises a second electrode that is directly coupled to a second capacitor and an amplifier circuit with an output terminal.

2. The liquid crystal display according to claim 1, wherein the ambient light photosensor reader unit is provided to the first surface of the active matrix substrate that is in contact with the liquid crystal layer.

3. The liquid crystal display according to claim 1, wherein the light-shielding layer is made of a resin material containing a light-shielding material that shields light.

4. The liquid crystal display according to claim 1, wherein the ambient light photosensor of the photodetector unit is a thin-film transistor that is manufactured together with another thin-film transistor serving as the switching element for the liquid crystal panel in a process for manufacturing the active matrix substrate.

5. The liquid crystal display according to claim 1, further comprising:

an illuminating unit for illuminating the liquid crystal panel; and a controller unit for controlling the illuminating unit in accordance with an output from the ambient light photosensor reader unit;

the controller unit including a threshold memory and a comparator, in normal operation mode, the comparator comparing an output from the photodetector unit and a threshold stored in the threshold memory, and a comparison result being used for controlling on/off of the illuminating unit, and in default mode, the ambient light photosensor being irradiated with reference light, and an output from the photodetector unit being stored in the threshold memory.

6. The liquid crystal display according to claim 1, wherein the liquid crystal panel is one of a transmissive liquid crystal display panel and a semi-transmissive liquid crystal display panel.

7. The liquid crystal display according to claim 1, wherein the first switching element applies the predetermined reference voltage to the photodetector unit, when the first switching element is turned on.

* * * * *